T. E. AMOS & G. J. ABERNATHY.
PEANUT DIGGER.
APPLICATION FILED MAY 19, 1914.
1,226,437.
Patented May 15, 1917.
3 SHEETS—SHEET 1.
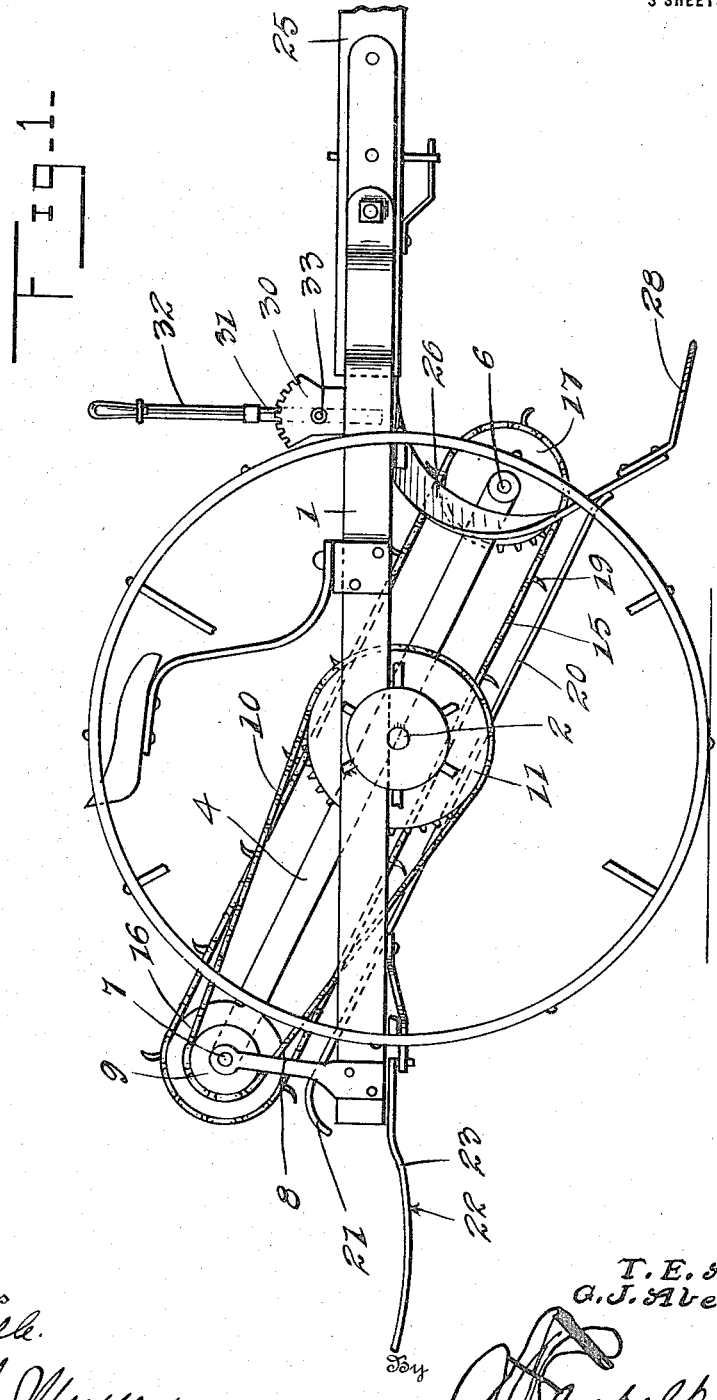
Witnesses
C. R. Beall.
Rob S. Meyer.
Inventors
T. E. Amos,
G. J. Abernathy.
By
A. Randolph Jr.
Attorney

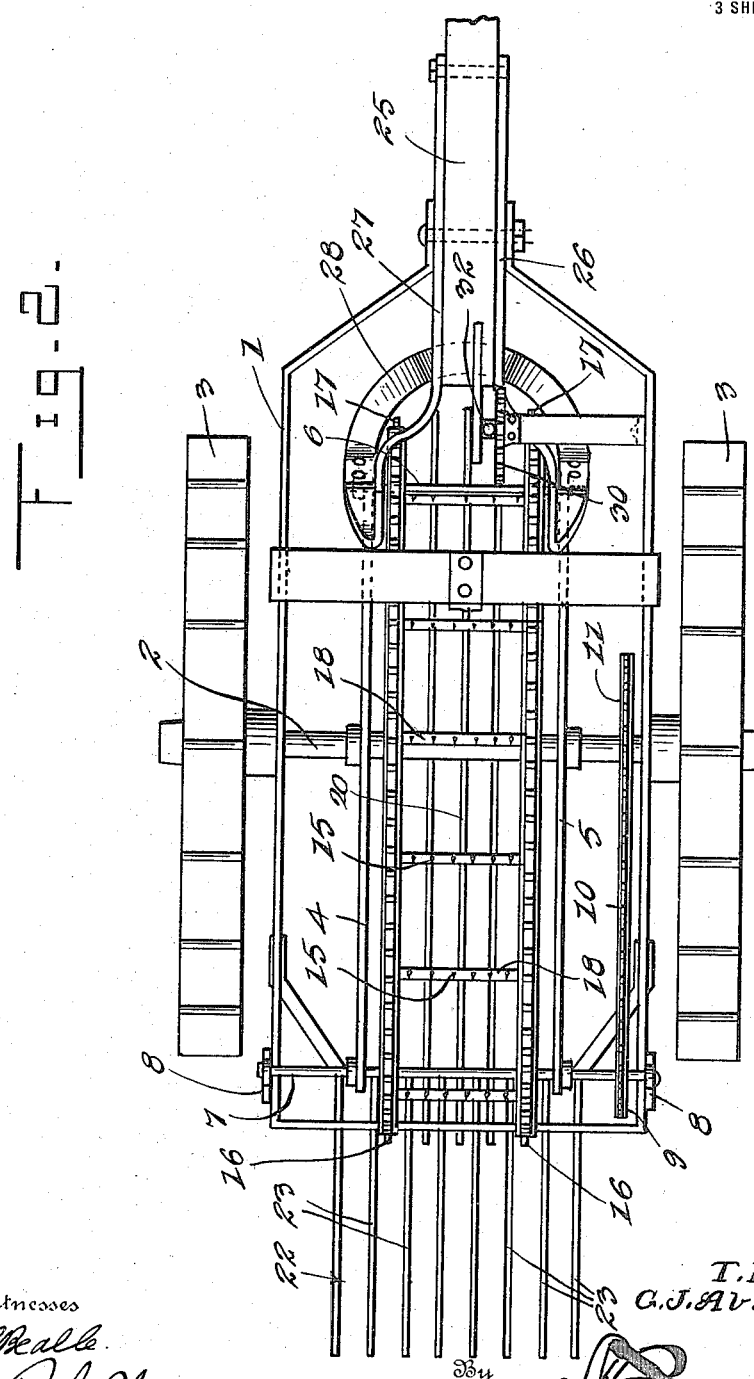

T. E. AMOS & G. J. ABERNATHY.
PEANUT DIGGER.
APPLICATION FILED MAY 19, 1914.
1,226,437.
Patented May 15, 1917.
3 SHEETS—SHEET 3.
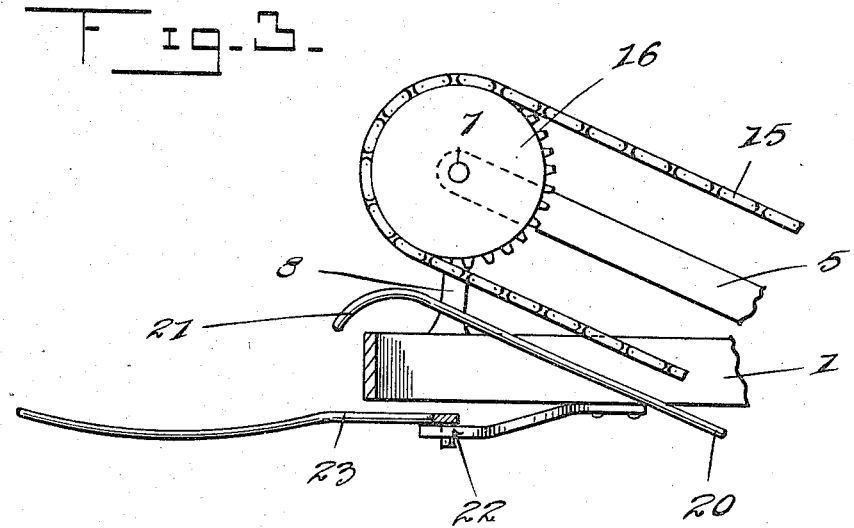
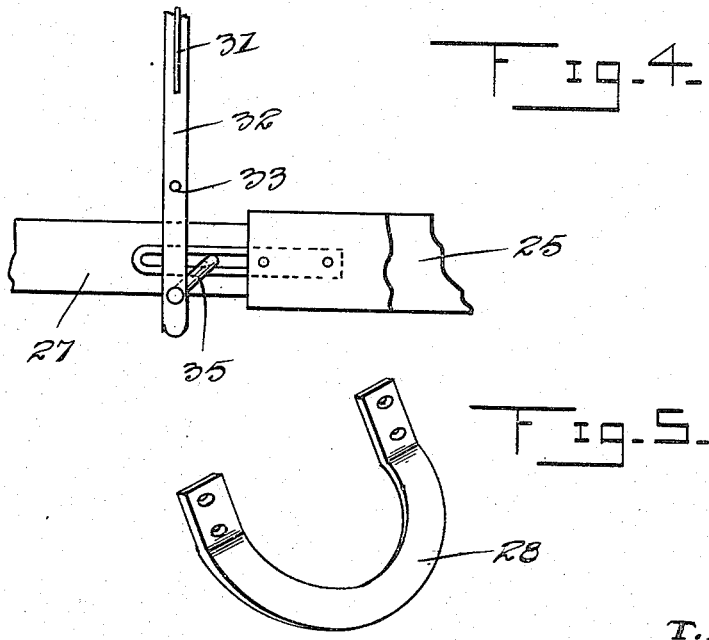
Witnesses
C. W. Bealle.
Robt. Meyer.
Inventors
T. E. Amos.
G. J. Abernathy.
By
Attorney

UNITED STATES PATENT OFFICE.

THOMAS E. AMOS AND GEORGE J. ABERNATHY, OF AMBROSE, TEXAS.

PEANUT-DIGGER.

1,226,437.

Specification of Letters Patent.

Patented May 15, 1917.

Application filed May 19, 1914. Serial No. 839,626.

*To all whom it may concern:*

Be it known that we, THOMAS E. AMOS and GEORGE J. ABERNATHY, citizens of the United States, residing at Ambrose, in the county of Grayson and State of Texas, have invented certain new and useful Improvements in Peanut-Diggers, of which the following is a specification.

This invention relates to harvesting machines, and more particularly to a machine for harvesting or digging peanuts.

The primary object of this invention is the provision of a harvesting machine which has a vertically adjustable plow shoe or shovel, which is substantially semi-circular in shape, for gathering or engaging the vines of a peanut plant for pulling the same from the ground and guiding the plant and peanuts to a conveyer for elevating along the machine and depositing upon a carrier at the rear end of the machine for ejecting therefrom in heaps or shocks preparatory to the hauling away.

Another object of this invention is the provision of a foraminous platform over which the peanut plants are elevated, which platform provides for the sifting through of the soil which might cling to the plant uprooted by the shovel blade.

With the foregoing and other objects in view, this invention consists in such novel features of construction, combination, and arrangement of parts as will be hereinafter more fully described, illustrated in the accompanying drawings, and claimed.

In describing the invention in detail reference will be had to the accompanying drawings, wherein like characters of reference designate like or corresponding parts throughout the several views, and in which:—

Figure 1 is a side elevation of the improved harvester showing the spokes of the traction wheel thereof broken away, Fig. 2 is a top plan view of the improved peanut digger, Fig. 3 is a sectional view of the rear end of the digger, Fig. 4 is a detail side elevation of parts of the mechanism for adjusting the digging shovel, and Fig. 5 is a detail perspective view of the digging shovel.

Referring more particularly to the drawings, 1 designates a substantially rectangular supporting frame which has the axle 2 suspended beneath its lower edges. The axle 2 has the ordinary type of traction wheels 3 mounted thereupon. The axle 2 has supporting braces 4 and 5 secured thereto intermediate of the sides of the substantially rectangular supporting frame 1, which braces extend upwardly and downwardly at an incline from the longitudinal lines of the frame 1, as is clearly shown in Fig. 1 of the drawings, and they have journaled in their terminal ends, shafts 6 and 7. The shaft 6 is journaled in the lower terminal ends of the braces 4 and 5, while the shaft 7 is journaled in the upper terminal end of the braces and in bearings 8, which are secured to the rear end of the rectangular frame 1. The shaft 7 has a sprocket 9 mounted adjacent one end thereof, which sprocket has a sprocket chain 10 passing thereabout. The sprocket chain 10 passes about a sprocket 11, which sprocket is mounted upon the axle 2 and rotates therewith for imparting rotation to the shaft 7 upon the traction of the peanut digger.

A conveyer 15 travels about the sprockets 16 and 17, which sprockets are mounted respectively upon the shafts 7 and 6. The conveyer 15 has a plurality of transversely extending bars or arms 18, which have projecting fingers 19 formed thereupon. The fingers 19 of the conveyer 16 travel upwardly a short distance above a conveying platform 20, which platform is supported by the substantially rectangular frame 1, and is constructed of a plurality of rods, being spaced apart from each other so as to provide a foraminous platform to permit of the dropping therethrough of dirt or soil which might cling to the peanuts.

The bars of which the conveying platform 20 is formed extend parallel with the bracing arms 4 and 5 and the conveyer 15, and the upper rear ends thereof are curved downwardly as is shown at 21, for depositing the peanuts upon the carrier 22. The carrier 22 is positioned at the rear end of the rectangular frame 1, and is formed of a plurality of pivotally supported rods 23, which rods may be operated in any suitable manner for ejecting the peanuts therefrom. The forward end of the substantially rectangular supporting frame 1 has a tongue 25 of the ordinary construction secured thereto, which tongue has the plow shoe supporting braces 110

26 and 27 secured to the sides thereof. The plow shoe supporting members 26 and 27 extend inwardly or rearwardly of the tongue 25, and are curved outwardly and downwardly, having the substantially semi-circular shovel or plow shoe 28 removably secured to their lower terminal ends. The plow shoe or shovel 28 is substantially semi-circular in shape, so as to efficiently engage a peanut plant and uproot the same, and it inclines upwardly so that the uprooted peanut plants will, upon the traction of the peanut digger, pass upwardly thereover, a short distance along the bracing arms 26 and 27 and onto the lower terminal ends of the rods of which the conveying platform 20 is mounted, where the plants will be engaged by the fingers 19 and carried upwardly over the platform 20 and deposited upon the carrier 22.

The supporting frame 1 has a quadrant 30 mounted thereupon, which quadrant receives the pawl or dog 31 which is mounted upon the lever 32. The lever 32 is pivotally supported at 33, and it has cranked connection through a crank link 35 with the arms or supporting braces 26 and 27, so that upon the oscillatory movement of the lever the plow shoe or shovel 28 will be vertically adjusted so as to engage the peanut plants, or to be out of engaging proximity with the ground, for the non-operative travel of the peanut digger.

From the foregoing description, taken in connection with the accompanying drawings, the advantages of the construction and of the method of operation of the improved peanut digger will be apparent to those skilled in the art to which this invention appertains, and while in the foregoing, the principle of the operation has been described, together with various features of construction, it is to be understood that certain minor features of construction, combination, and arrangement of parts may be altered to suit practical conditions, provided such alterations are comprehended within the scope of what is claimed.

What is claimed is:—

1. In a peanut digger, a substantially rectangular supporting frame having a tongue secured to its forward end, a pair of supporting braces secured to said tongue and curving downwardly therefrom, a substantially semi-circular shovel blade secured to the lower terminals of said supporting braces, a lever pivotally carried by said supporting frame, a crank link connected to the lower end of said lever, said crank link being connected to said supporting braces whereby oscillatory movement of the lever will raise or lower said semi-circular shovel blade.

2. In a peanut digger, a substantially rectangular supporting frame having a tongue secured to its forward end, a pair of supporting braces secured to said tongue and curving downwardly therefrom, a substantially semi-circular shovel blade secured to the lower terminals of said supporting braces, a lever pivotally carried by said supporting frame, a crank link connected to the lower end of said lever, said crank link being connected to said supporting braces whereby oscillatory movement of the lever will raise or lower said semi-circular shovel blade, a conveyer structure carried by said supporting frame for receiving peanuts from said uprooting shovel blade, a carrier carried by the rear end of said supporting frame for receiving the peanuts from said conveyer structure, said carrier including a plurality of pivotally supported rods for movement into or out of a supporting position.

In testimony whereof we affix our signatures in presence of two witnesses.

THOMAS E. AMOS.
GEORGE J. ABERNATHY.

Witnesses:
H. W. WITCHER,
W. B. BLOUTON.

Copies of this patent may be obtained for five cents each, by addressing the "Commissioner of Patents, Washington, D. C."